United States Patent
Achten et al.

(10) Patent No.: US 10,398,236 B2
(45) Date of Patent: Sep. 3, 2019

(54) POROUS BODY, ADDITIVE MANUFACTURING METHOD FOR THE BODY AND APPARATUS FOR SUPPORTING AND/OR BEARING A PERSON

(71) Applicant: Covestro Deutschland AG, Leverkusen (DE)

(72) Inventors: Dirk Achten, Leverkusen (DE); Thomas Busgen, Cologne (DE); Dirk Dijkstra, Odenthal (DE); Nicolas Degiorgio, Krefeld (DE); Roland Wagner, Leverkusen (DE); Levent Akbas, Witten (DE); Peter Reichert, Dormagen (DE); Jurgen Hattig, Odenthal (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/701,950

(22) Filed: Sep. 12, 2017

(65) Prior Publication Data

US 2018/0070736 A1      Mar. 15, 2018

(30) Foreign Application Priority Data

Sep. 13, 2016 (EP) .................................... 16188521

(51) Int. Cl.
*A47C 27/14* (2006.01)
*B33Y 10/00* (2015.01)
(Continued)

(52) U.S. Cl.
CPC ............ *A47C 27/14* (2013.01); *A47C 21/044* (2013.01); *A47C 23/002* (2013.01);
(Continued)

(58) Field of Classification Search
None
See application file for complete search history.

(56) References Cited

U.S. PATENT DOCUMENTS 5,444,881 A * 8/1995 Landi ................... A61G 5/1043
5/708
5,921,858 A * 7/1999 Kawai .................. B60N 2/5628
297/180.11

(Continued)

FOREIGN PATENT DOCUMENTS

DE      102015100816 B3      12/2015

OTHER PUBLICATIONS

Maiti et al.; "3D Printed Cellular Solid Outperforms Traditional Stochastic Foam in Long-term Mechanical Response"; Sci. Rep. 6, 24871; doi:10.1038/srep24871 (2016).

*Primary Examiner* — Chinessa T. Golden
(74) *Attorney, Agent, or Firm* — Drinker Biddle & Reath LLP

(57) ABSTRACT

It is a feature of a porous body comprising a three-dimensional network of node points joined to one another by struts, and a void volume present between the struts, that the struts have an average length of ≥200 μm to ≤50 mm, the struts have an average thickness of ≥100 μm to ≤5 mm, and that the porous body has a compression hardness (40% compression, DIN EN ISO 3386-1: 2010-09) in at least one spatial direction of ≥10 to ≤100 kPa. The porous body according to the invention combines the advantages of a conventional mattress or cushion with ventilatability which results from its porous structure and is not achievable in conventional foams. The invention further relates to a method of producing such a porous body and to an apparatus comprising said body for supporting and/or bearing a person.

25 Claims, 3 Drawing Sheets

(51) Int. Cl.
    *B33Y 30/00*     (2015.01)
    *B33Y 80/00*     (2015.01)
    *B29C 64/118*    (2017.01)
    *B29C 64/209*    (2017.01)
    *A47C 21/04*     (2006.01)
    *A47C 23/00*     (2006.01)
    *B29C 64/106*    (2017.01)
    *B29K 75/00*     (2006.01)
    *B29L 31/00*     (2006.01)

(52) U.S. Cl.
    CPC .......... *B29C 64/106* (2017.08); *B29C 64/118* (2017.08); *B29C 64/209* (2017.08); *B33Y 10/00* (2014.12); *B33Y 30/00* (2014.12); *B33Y 80/00* (2014.12); *B29K 2075/00* (2013.01); *B29L 2031/751* (2013.01)

(56) References Cited

U.S. PATENT DOCUMENTS

| | | |
|---|---|---|
| 2010/0119792 A1 | 5/2010 | Ma |
| 2012/0028024 A1* | 2/2012 | Obi ............... C08G 18/283 428/304.4 |
| 2012/0077010 A1* | 3/2012 | Manesis ............ B29C 67/20 428/220 |
| 2013/0171019 A1 | 7/2013 | Gessler et al. |
| 2013/0273347 A1* | 10/2013 | Jacobsen ............ B32B 3/26 428/304.4 |
| 2016/0346997 A1 | 12/2016 | Lewis et al. |

* cited by examiner

POROUS BODY, ADDITIVE MANUFACTURING METHOD FOR THE BODY AND APPARATUS FOR SUPPORTING AND/OR BEARING A PERSON

CROSS REFERENCE TO RELATED APPLICATIONS

This application is a Paris Convention filing of EP 16188521.5 application, filed Sep. 13, 2016, which is incorporated by reference herein.

FIELD OF THE INVENTION

The present invention relates to a porous body comprising a three-dimensional network of node points connected to one another by struts and a void volume present between the struts, which can be used in the form of a supporting element or bearing element. The invention also relates to a method of producing such a porous body and to an apparatus comprising said body for supporting and/or bearing a person.

BACKGROUND OF THE INVENTION

Supporting elements or bearing elements of the type in question may take the form, for example, of mattresses. Mattresses of this kind typically consist of foam materials, and the mattresses may especially consist of multiple superposed foam layers. In order to increase the lying comfort of such mattresses, it is customary to undertake what is called zoning in mattresses. Zoning of this kind forms zones with different elastic properties, i.e. different degrees of yielding, distributed over the area of the mattress. This takes account of the fact that a mattress should have a different degree of yielding in the leg region, for example, than in the back region. Formation of zoning of this kind in multilayer mattresses is typically accomplished by incorporating cavities in a localized manner into a middle mattress layer with oscillating blades. On the upper and lower sides of this middle mattress layer, fully continuous upper and lower mattress layers are then applied in each case.

DE 10 2015 100 816 B3 discloses a process for producing a body-supporting element formed by a mattress, a cushion, a seat or part of a seat, comprising the process steps of defining print data which form a person-specific three-dimensional support structure and the production of the body-supporting element using the print data by means of a 3D printer. With the print data, it is possible to produce regions of different elasticity through the formation of cavities of different sizes and/or different number by means of the 3D printer.

It is stated that, in the process according to DE 10 2015 100 816 B3, production of the body-supporting element can be accomplished using elastic materials which, in the printing process conducted with the 3D printer, are mixed with a binder. Elastic materials used may be elastomeric materials, especially plastics. The 3D printer may have spraying means, in which case elastic materials are sprayed from first spraying means and binder from second spraying means. The elastic materials may be in powder form.

DE 10 2015 100 816 B3 does not make any statements as to whether the elastomeric material forms a porous body. It is stated that, by means of the 3D printer, depending on the print data, regions of different elasticity of the body-supporting element are generated through the formation of cavities of different sizes and/or different number. In order to obtain a three-dimensional variation of the elasticity of the mattress 3, it is possible to incorporate cavities in a controlled manner at particular sites in the mattress in the 3D printer. A void volume at a particular site is generated by not spraying any binder via the second spraying means, such that the elastomeric material sprayed via the first spraying means cannot bond there with the binder to form a material structure. Alternatively, it is also possible for no elastomeric material to be sprayed via the first spraying means, such that there is no wastage of pulverulent elastomeric material.

DE 10 2015 100 816 B3 states that the cavities generated with the 3D printer can have any desired geometries, and these may especially take the form of inclusions that may be surrounded on all sides by the material structure of the mattress. In addition, it is stated that the cavities can be generated in different sizes, and it is especially also possible here for very small cavities to be generated, which means that particularly high spatial resolution of the variation in the elastic properties of the mattresses is to be achieved.

Traditionally, flexible polyurethane foams are used in large volumes for the production of mattresses, cushions and the like, which is documented in numerous patent and non-patent publications. By contrast, reports relating to materials that could be characterized as foams produced by additive methods are less common.

The publication by Maiti, A. et al. "3D printed cellular solid outperforms traditional stochastic foam in long-term mechanical response", Sci. Rep. 6, 24871; doi: 10.1038/srep24871 (2016) describes materials formed from polydimethylsiloxane elastomer (PDMS) that are produced by means of the direct ink writing method. The material was built up layer by layer, with each layer composed of equally spaced PDMS cylinders of diameter 250 μm.

WO 2012/028747 A1 relates to a process for producing a three-dimensional object from a construction material by an additive layer construction method, in which, proceeding from material characteristics of the construction material and defined properties of the object to be manufactured, an internal structure of the object comprising a grid structure is calculated and the three-dimensional object with this internal structure is produced by the additive layer construction method, such that it has the defined properties.

An important criterion for the perception of comfort in a body-supporting element, for example, a mattress or cushion, is the extent to which the material of the element permits exchange of air through the element with the surrounding air. Without this exchange of air, it would not be possible either for heat to be removed from the human body, which leads to increased perspiration, or for moist air from perspiration from the human body or from a washing process to be transported away.

The problem addressed by the present invention is that of at least partly overcoming at least one drawback of the prior art. A further problem addressed by the present invention is that of providing a porous body suitable for load-bearing for perspiring bodies which permits optimized exchange of air (in order to provide maximum comfort for the perspiring body). A further problem addressed by the invention was that of providing a porous body which, in terms of its perception of comfort for a user, is comparable to a conventional mattress or cushion. An additional problem addressed by the invention was to be able to produce a porous body in a very cost-efficient and/or individualized and/or resource-conserving manner.

SUMMARY OF THE INVENTION

According to the invention, at least one of these problems is solved by a porous body having the features of claim 1.

A production method for such a body is provided in claim 13. An apparatus for supporting and/or bearing a person comprising such a body is provided in claim 14. Advantageous developments are specified in the dependent claims. They can be combined as desired, unless the opposite is clearly apparent from the context. These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
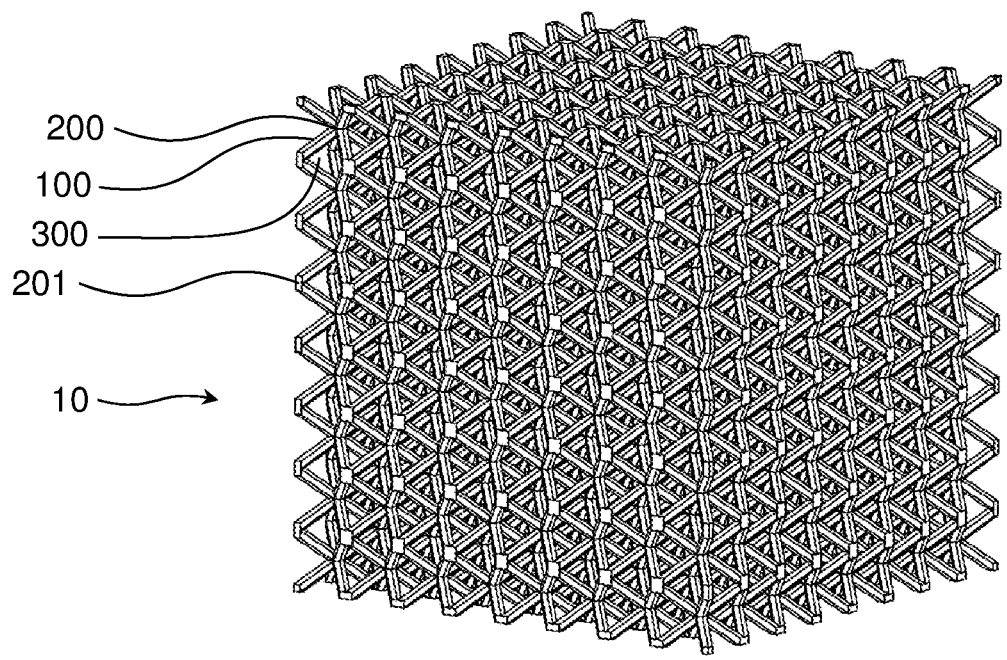
FIG. 1 shows a porous body according to the invention in a first view.

The present invention will now be described for purposes of illustration and not limitation.

A porous body according to the invention comprises a three-dimensional network of node points joined to one another by struts, and a void volume present between the struts. The struts have an average length of ≥200 µm to ≤50 mm. The struts also have an average thickness of ≥100 µm to ≤5 mm. The porous body has a compression hardness (40% compression, DIN EN ISO 3386-1: 2010-09) in at least one spatial direction of ≥10 to ≤100 kPa.

The porous body according to the invention combines the advantages of a conventional mattress or cushion with ventilatability which results from its porous structure and is not achievable in conventional foams.

The porous body according to the invention can be manufactured in an additive manufacturing method without external support elements in the vertical construction of its structure.

The struts have an average length of ≥200 µm to ≤50 mm, preferably ≥500 µm to ≤10 mm and more preferably ≥750 µm to ≤5 mm. The struts also have an average thickness of ≥100 µm to ≤5 mm, preferably ≥500 µm to ≤2.5 mm and more preferably ≥750 µm to ≤1 mm. If the thickness changes over the course of an individual strut, which may quite possibly be intentional for construction purposes, the average thickness is first determined for the individual strut and then this value is used for the calculation of the average thickness of the totality of the struts.

A specific example would be a porous body according to the invention having an average length of the struts of ≥4 mm to ≤5 mm and an average thickness of the struts of ≥800 µm to ≤900 µm.

The porous body according to the invention, also referred to merely as body hereinafter, can be compressed, in accordance with its end use as a supporting element and/or bearing element. In at least one spatial direction, the body has a compression hardness (40% compression, DIN EN ISO 3386-1:2010-09) of ≥10 to ≤100 kPa, preferably ≥20 to ≤70 kPa and more preferably ≥30 to ≤40 kPa.

The average spatial density of the node points in the porous body according to the invention may, for example, be ≥5 node points/cm$^3$ to ≤200 node points/cm$^3$, preferably ≥10 node points/cm$^3$ to ≤100 node points/cm$^3$, more preferably ≥30 node points/cm$^3$ to ≤60 node points/cm$^3$.

Suitable materials for the porous body according to the invention are especially elastomers such as polyurethane elastomers. It is generally the case that elastomers can be configured as thermoset or thermoplastic materials or else mixtures thereof. In the porous body according to the invention, preference is given to using materials which, at a density of ≥1 kg/l, have a Shore A hardness (DIN ISO 7619-1) of ≥40 Shore A and ≤98 Shore A, preferably ≥60 Shore A and ≤95 Shore A. Preference is given to thermoplastic polyurethane elastomers.

In a preferred embodiment of the porous body, the porous body has a compression set after 40% compression (DIN ISO 815-1) of ≤5%, preferably ≤3%, more preferably ≤1%.

In order to further increase comfort in use as a supporting element and/or bearing element, the porous body according to the invention may also have viscoelastic properties. In a preferred embodiment, the porous body in at least one spatial direction has a maximum tan δ value (DMA, DIN EN ISO 6721) at ≥−10° C. to ≤40° C., preferably ≥10° C. to ≤35° C., more preferably ≥18° C. to ≤30° C. Preferably, the porous body has a tan δ value (20° C., DMA, DIN EN ISO 6721) of the body in at least one spatial direction of ≥0.1 to ≤1.5, preferably ≥0.2 to ≤1.2, more preferably ≥0.3 to ≤1.1.

In a further preferred embodiment of the porous body, the compression hardness (40% compression, DIN EN ISO 3386-1:2010-09) of the body in a selected spatial direction differs by ≥10%, preferably ≥15% to ≤200%, more preferably ≥20% to ≤100%, from the compression hardness (40% compression, DIN EN ISO 3386-1:2010-09) of the body in a spatial direction at right angles to the selected spatial direction.

Preferably, the tan δ value (20° C., DMA, DIN EN ISO 6721) of the porous body in a selected spatial direction differs by ≥10%, or preferably ≥15% to ≤200%, more preferably ≥20% to ≤100%, from the tan δ value (20° C., DMA, DIN EN ISO 6721) of the body in a spatial direction at right angles to the selected spatial direction.

A porous body according to the invention with such anisotropic characteristics in terms of these mechanical properties is appropriately produced by means of additive manufacturing. In this way, it is possible in a controlled manner to define the length and thickness of individual struts, for example, in order to adjust the anisotropic characteristics of the body.

In a further preferred embodiment, the compression hardness (40% compression, DIN EN ISO 3386-1:2010-09) of the body in a selected spatial direction differs by ≤10%, preferably ≤5%, more preferably ≤2%, from the compression hardness (40% compression, DIN EN ISO 3386-1: 2010-09) of the body in other spatial directions.

Additionally or alternatively, the tan δ value (20° C., DMA, DIN EN ISO 6721) of the body, preferably in a selected spatial direction, differs by ≤10%, preferably ≤5%, more preferably ≤2%, from the tan δ value (20° C., DMA, DIN EN ISO 6721) of the body in one of the other spatial directions.

The smaller the difference in the tan δ value of the body in the different spatial directions, the more isotropic the characteristics thereof in terms of these mechanical properties.

In a further preferred embodiment, the body is formed at least partly from a material having one or more of the following properties:
- a tan δ value (20° C., DMA, DIN EN ISO 6721) of ≥0.1 to ≤1.5, preferably ≥0.2 to ≤1.2, more preferably ≥0.3 to ≤1.1
- a maximum tan δ value (DMA, DIN EN ISO 6721) at ≥−10° C. to ≤40° C., preferably ≥10° C. to ≤35° C., more preferably ≥18° C. to ≤30° C.
- a modulus of elasticity (DIN EN ISO 604:2003-12) of ≥1 MPa to ≤800 MPa, preferably ≥5 MPa to ≤400 MPa, more preferably ≥10 MPa to ≤200 MPa
- a Shore hardness (DIN ISO 7619-1:2012-02) of ≥40 A to ≤70 D, preferably ≥50 Shore A to ≤98 Shore A, more preferably ≥60 Shore A to ≤95 Shore A
- a melting point (DIN EN ISO 11357-3:2013-04) of ≤220° C., preferably ≥30° C. to ≤210° C., more preferably ≥40° C. to ≤200° C.
- a glass transition temperature $T_g$ (DMA, DIN EN ISO 6721) of ≤40° C., preferably ≥−10° C. to ≤40° C., more preferably ≥10° C. to ≤35° C.

In addition to the embodiments outlined above, properties of the body material and not of the body per se are thus introduced. It is specifically an advantage of the body according to the invention that variation in the body construction, for example of the body structure, composed of at least one base material can give bodies having different mechanical properties. This simplifies logistics and stockholding for a producer. On the other hand, different materials can be processed by adjustment of the body construction to give bodies having comparable mechanical properties, which can mean greater flexibility in the procurement of starting materials for a producer.

In a further preferred embodiment, the void volume makes up ≥50% to ≤99%, preferably ≥55% to ≤95%, more preferably ≥60% to ≤90%, of the volume of the body. With knowledge of the density of the starting material for the body and a density of the body itself, this parameter can be determined easily. Preferably, the void volume makes up ≥65% to ≤85% of the volume of the body.

In a further preferred embodiment, the node points are distributed in a periodically repeating manner in at least part of the volume of the body. If the node points are distributed in a periodically repeating manner in a volume, this circumstance can be described by the means of crystallography. The node points may be arranged in accordance with the 14 Bravais lattices: simple cubic (sc), body-centred cubic (bcc), face-centred cubic (fcc), simple tetragonal, body-centred tetragonal, simple orthorhombic, base-centred orthorhombic, body-centred orthorhombic, face-centred orthorhombic, simple hexagonal, rhombohedral, simple monoclinic, base-centred monoclinic and triclinic. Preference is given to the cubic lattices sc, fcc and bcc.

The construction of the porous body according to the invention may, at least in cases of regular arrangement of the node points in the space, also be described as the result of penetration of hollow channels through a formerly solid body. Thus, in a further embodiment, the void volume is formed in the form of mutually penetrating first, second and third groups of channels, wherein a multitude of individual channels within each respective group of channels run parallel to one another and the first group of channels, the second group of channels and the third group of channels extend in different spatial directions.

For the use of the porous body according to the invention as a cushion, mattress and the like, it may be advantageous when it has regions of different mechanical properties and especially regions having different compression hardness and possibly different tan δ values. Thus, a mattress in the region of the shoulder areas may be configured in order to allow a person lying on his/her side to sink lower than the rest of the person's body, in order that the person still lies straight overall with respect to the spinal column. If the body takes the form of a one-piece mattress, the variation in the mechanical properties can especially be achieved through one or both of the embodiments described hereinafter. In this respect, it is possible to achieve a modular construction to give a one-piece mattress, a one-piece cushion, etc.

In a further preferred embodiment of the porous body, the average minimum angle between adjacent struts in the porous body is ≥30° to ≤140°, preferably ≥45° to ≤120°, more preferably ≥0° to ≤100°. This angle is always ascertained in the unstressed state of the body. Adjacent struts are those struts that have a common node point. The minimum angle between two adjacent struts should be understood such that, considering a strut having multiple adjacent struts that form different angles with the strut in question, the smallest of these angles is selected. One example of this is a node point having, expressed in chemical language, octahedral coordination. Six struts emanate from this node point, with opposite struts forming an angle of 180° to one another and struts that are directly adjacent in a plane forming an angle of 90° to one another. In this example, the minimum angle between adjacent struts would be 90°.

In a further preferred embodiment of the porous body, the spatial density of the node points in a first region of the body is thus different from the spatial density of the node points in a second region of the body. From a geometric point of view, the center of the node points is being considered here. The spatial density of the node points in the first region of the body may, for example, be ≥5 node points/cm³ to ≤200 node points/cm³, preferably ≥10 node points/cm³ to ≤100 node points/cm³, more preferably ≥3 node points/cm³ to ≤60 node points/cm³. The spatial density of the node points in the second region of the body may, with the proviso that it is different from the density in the first region, for example, be ≥5 node points/cm³ to ≤200 node points/cm³, preferably ≥10 node points/cm³ to ≤100 node points/cm³, more preferably ≥3 node points/cm³ to ≤60 node points/cm³.

It is also possible to express the differences in spatial density in that the spatial density of the node points in a first region of the body is ≥1.1 times to ≤10 times, preferably ≥1.5 times to ≤7 times, more preferably ≥2 times to ≤5 times, the spatial density of the node points in a second region of the body.

A specific example would be a porous body according to the invention having a density of the node points in a first region of ≥39 node points/cm³ to ≤41 node points/cm³ and a density of the node points in a second region of ≥19 node points/cm³ to ≤21 node points/cm³.

In a further preferred embodiment of the porous body, the material of the body in a first region of the body is different from the material in a second region of the body. Different materials having correspondingly different mechanical properties can preferably be used in a melt layering process with printheads for more than one material for production of the body according to the invention. Useful materials are either two different materials from one substance class, for example two thermoplastic polyurethane elastomers having different moduli of elasticity, or two materials from different substance classes. An example of this is two members from the group of: thermoplastic elastomers (TPE), thermoplastic polyurethane (TPU), polycarbonate (PC), polyamide (PA), polyethylene terephthalate (PET), polybutylene terephthalate (PBT), cycloolefinic copolyesters (COC), polyether ether ketone (PEEK), polyether amide ketone (PEAK), polyetherimide (PEI), polyimide (PI), polypropylene (PP) or polyethylene (PE), acrylonitrile-butadiene-styrene (ABS), polylactate (PLA), polymethylmethacrylate (PMMA), polystyrene (PS), polyvinyl chloride (PVC), polyoxymethylene (POM), polyacrylonitrile (PAN), polyacrylate or celluloid.

The present invention further relates to a method of producing a porous body according to the invention, wherein the body is produced in an additive manufacturing method. By means of an additive manufacturing method, individualized adjustment, for example, of the damping properties of a porous body according to the invention that has been envisaged as a mattress is possible. "Individualized" means here that it is possible to produce not just individual pieces, but that it is also possible to adjust the cushioning properties of a support or bearing element at different points as desired and as part of the process. It is thus possible, for example, for a mattress to be created individually for a customer according to anatomical requirements or needs. In order, for example, to achieve an optimal pressure distribution when lying on the mattress, it is first possible to record a pressure profile of the body on a sensor surface and use the data thus obtained for the individualization of the mattress. The data are then sent to the additive manufacturing method in a manner known per se.

The process may be selected, for example, from melt layering (fused filament fabrication, FFF, or fused deposition modelling, FDM), inkjet printing, photopolymer jetting, stereo lithography, selective laser sintering, digital light processing-based additive manufacturing system, continuous liquid interface production, selective laser melting, binder jetting-based additive manufacturing, multijet fusion-based additive manufacturing, high speed sintering process and laminated object modelling. The additive manufacturing method is preferably a sintering method or a melt layering method.

In the context of the present invention, sintering methods are methods which utilize thermoplastic powders in particular in order to build up articles layer by layer. In this context, by means of what is called a coater, thin layers of powder are applied and then selectively melted by means of an energy source. The surrounding powder here supports the component geometry. Complex geometries can thus be manufactured in a more economically viable manner than in the FDM method. Moreover, various articles can be arranged or manufactured in tightly packed form in what is called the powder bed. Owing to these advantages, powder-based additive manufacturing methods are among the most economically viable additive manufacturing methods on the market. They are therefore used predominantly by industrial users. Examples of powder-based additive manufacturing methods are selective laser sintering (SLS) or high-speed sintering (HSS). They differ from one another in the method of introducing the energy for the selective melting into the plastic. In the laser sintering method, the energy is introduced via a directed laser beam. In the high-speed sintering (HSS) method, the energy is introduced via infrared (IR) sources in combination with an IR absorber selectively printed into the powder bed. Selective heat sintering (SHS) utilizes the printing unit of a conventional thermal printer in order to selectively melt thermoplastic powders. Preference is given to selective laser sintering methods (SLS).

The term "melt layering method" refers to a manufacturing method from the field of additive manufacturing, with which a workpiece is built up layer by layer, for example from a fusible plastic. The plastic can be used with or without further additions such as fibres. Machines for FFF are part of the machine class of the 3D printers. This method is based on the liquefaction of a plastic or wax material in wire form by heating. In the course of final cooling, the material solidifies. The material is applied by extrusion with a heating nozzle which is freely movable in relation to a plane of manufacture. It is possible here either for the manufacturing plane to be fixed and the nozzle to be freely movable or for a nozzle to be fixed and a substrate table (with a manufacturing plane) to be moved, or for both elements, the nozzle and manufacturing plane, to be movable. The speed with which the substrate and nozzle are movable with respect to one another is preferably within a range from 1 to 200 mm/s. According to the application, the layer thickness is within a range of 0.025 to 1.25 mm; the exit diameter of the material jet (nozzle outlet diameter) of the nozzle is typically at least 0.05 mm.

In the layer-by-layer model production, the individual layers are thus combined to form a complex part. A body is typically constructed by tracing each working plane line by line (formation of a layer) and then moving the working plane upward in the manner of a stack (forming at least one further layer atop the first layer), giving rise to a shape in a layer-by-layer manner. The exit temperature of the material mixtures from the nozzle may, for example, be 80° C. to 420° C. It is additionally possible to heat the substrate table, for example to 20° C. to 250° C. It is thus possible to prevent excessively fast cooling of the layer applied, such that a further layer applied thereon bonds sufficiently to the first layer.

The present invention further relates to an apparatus for supporting and/or bearing a person, comprising a porous body according to the invention. The apparatus according to the invention may, for example, be a bed or a cushioned item of furniture. As well as the porous body according to the invention that functions as a mattress or cushion area, the apparatus may comprise active and passive elements. Passive elements are components such as frames, joints, rollers and the like. Active elements may be actuator motors, for example motors for adjustment of a bed geometry, sensors or other elements that provide a desired functionality.

Preferably, the apparatus according to the invention is a bed for hospitals and care institutions. A further preferred field of use is that of seats in vehicles, especially in vehicles for long distances. In such applications, the advantages of the porous body according to the invention, namely viscoelastic properties coupled with ventilatability not achievable in conventional foams, are manifested particularly well.

In one embodiment, the apparatus according to the invention further comprises a ventilator for passing air through at least a portion of the porous body. In the simplest case, air from the environment of the apparatus is guided through at least a portion of the porous body, such that the moisture released through perspiration by a person utilizing the apparatus and sitting or lying on the porous body can be transported away easily. This alone increases sitting or lying comfort.

If the air is heated by one or more heating elements with respect to room temperature (temperature >20° C.) or is cooled by one or more cooling elements (temperature ≤20° C.), the perception of comfort can be increased further.

FIG. 1 shows a porous body 10 according to the invention in perspective view with a three-dimensional network of node points 200 joined to one another by struts 100. Between the struts 100 is the void space 300. At the edges of the body 10, there are truncated node points 201, the struts from which project only into the interior of the body 10.

Figure 2:
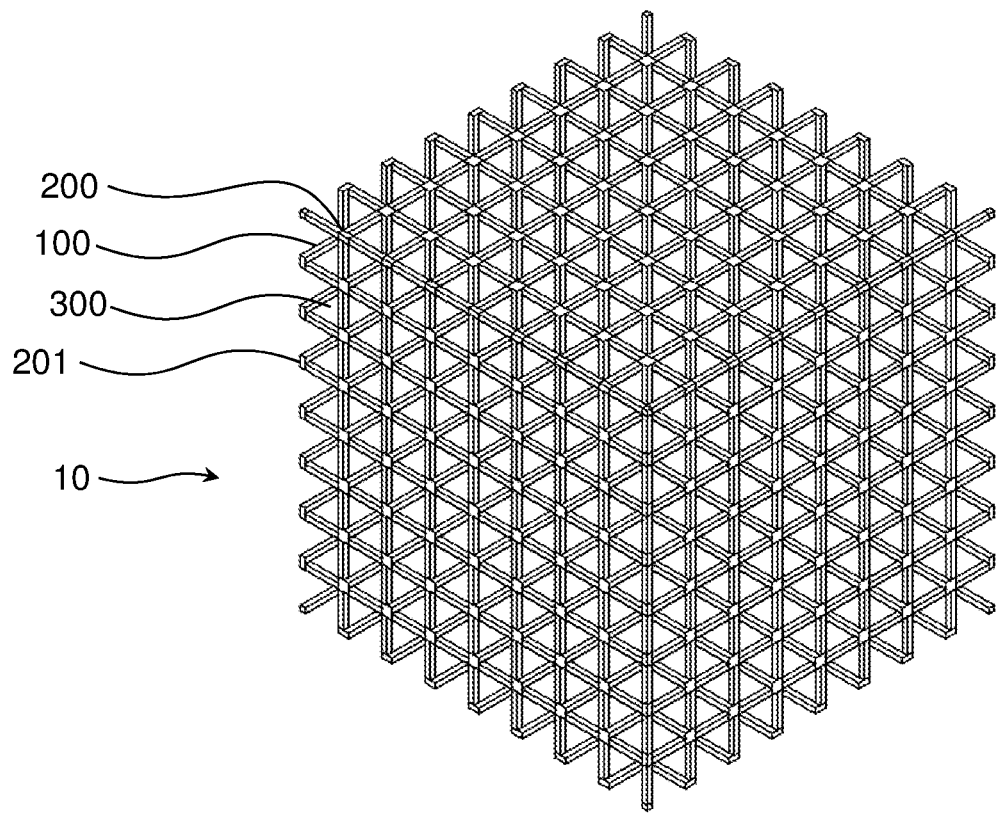
FIG. 2 shows the porous body according to the invention from FIG. 1 in another view.
Figure 3:
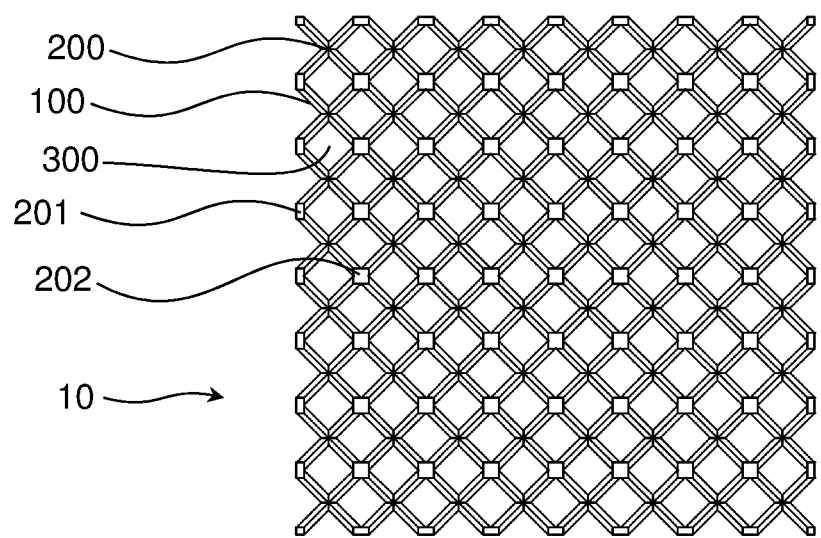
FIG. 3 shows the porous body according to the invention from FIG. 1 in another view.

FIG. 2 shows the same body 10 in a first isometric view and FIG. 3 the same body 10 in a further isometric view, corresponding to a top view of one side of the body 10. On the outer faces of the body 10 shown in FIG. 3, there are also truncated node points identified by the reference numeral 202.

The node points 200 in the body 10 according to the invention may be in regular distribution in at least part of its volume. It is likewise possible for them to be in irregular distribution in at least part of its volume. It is also possible that the body 10 has one or more sub-volumes in which the node points 200 are in regular distribution and one or more sub-volumes in which the node points 200 are in irregular distribution.

According to the structure of the network composed of struts 100 and node points 200 in the porous body 10 according to the invention, particular mechanical properties may also be a function of the spatial direction in which they are determined on the body. This is the case, for example, for the body 10 shown in FIGS. 1 to 3. Along the spatial directions corresponding to the base factors of the unit cell, the compression hardness and the tan δ value in particular may be different than, for example, in a spatial direction including all three base spectres as components.

It is possible that the void volume 300 makes up ≥50% to ≤99%, preferably ≥55% to ≤95%, more preferably ≥60% to ≤90%, of the volume of the body 10. With knowledge of the density of the starting material for the body and the density of the body itself, it is easily possible to determine this parameter.

Preferably, the node points 200 in at least part of the volume of the body 10 are in periodically repeating distribution. When the node points 200 in a volume are in periodically repeating distribution, this circumstance can be described by the means of crystallography. The node points may be arranged in accordance with the 14 Bravais lattices: simple cubic (sc), body-centered cubic (bcc), face-centered cubic (fcc), simple tetragonal, body-centered tetragonal, simple orthorhombic, base-centered orthorhombic, body-centered orthorhombic, face-centered orthorhombic, simple hexagonal, rhombohedral, simple monoclinic, base-centered monoclinic and triclinic. Preference is given to the cubic lattices sc, fcc and bcc.

Persisting with the crystallographic view, the number of struts 100 via which one node point 200 is connected to other node points can be regarded as the coordination number of the node point 200. The average number of struts 100 that proceed from the node points 200 may be ≥4 to ≤12, but it is also possible to achieve coordination numbers that are unusual or are impossible in crystallography. For the determination of the coordination numbers, truncated node points on the outer face of the body, as given by reference numeral 201 in FIG. 1, are not taken into account.

The presence of unusual coordination numbers or those that are impossible in crystallography can especially be achieved when the porous body according to the invention is produced by means of additive manufacturing techniques. It is likewise possible that a first group of node points 200 has a first average number of struts 100 and a second group of node points has a second average number of struts 100, where the first average number is different from the second average number.

In body 10 shown in FIGS. 1 to 3, the node points 200 are arranged in a body-centered cubic lattice. The coordination number and hence the average number of struts that proceed therefrom is 8.

It is possible that the average minimum angle between adjacent struts 100 is ≥30° to ≤140°, preferably ≥45° to ≤120°, more preferably ≥50° to ≤100°. In the case of the body 10 shown in FIGS. 1 to 3, at all points, the minimum angle between the struts 100 is about 70.5° (arccos(⅓)), as can be inferred from trigonometric considerations relating to the angle between the spatial diagonals of a cube.

The structure of the porous body according to the invention may, at least in cases of regular arrangement of the node points 200 in the space, also be described as the result of penetration of hollow channels through a formerly solid body 20. Thus, with reference to FIG. 4, the cavity 300 may take the form of mutually penetrating first 310, second 320 and third 330 groups of channels, where a multitude of individual channels 311, 321, 331 within each respective group of channels run parallel to one another and the first group of channels 310, the second group of channels 320 and the third group of channels 330 extend in different spatial directions.

Figure 4:
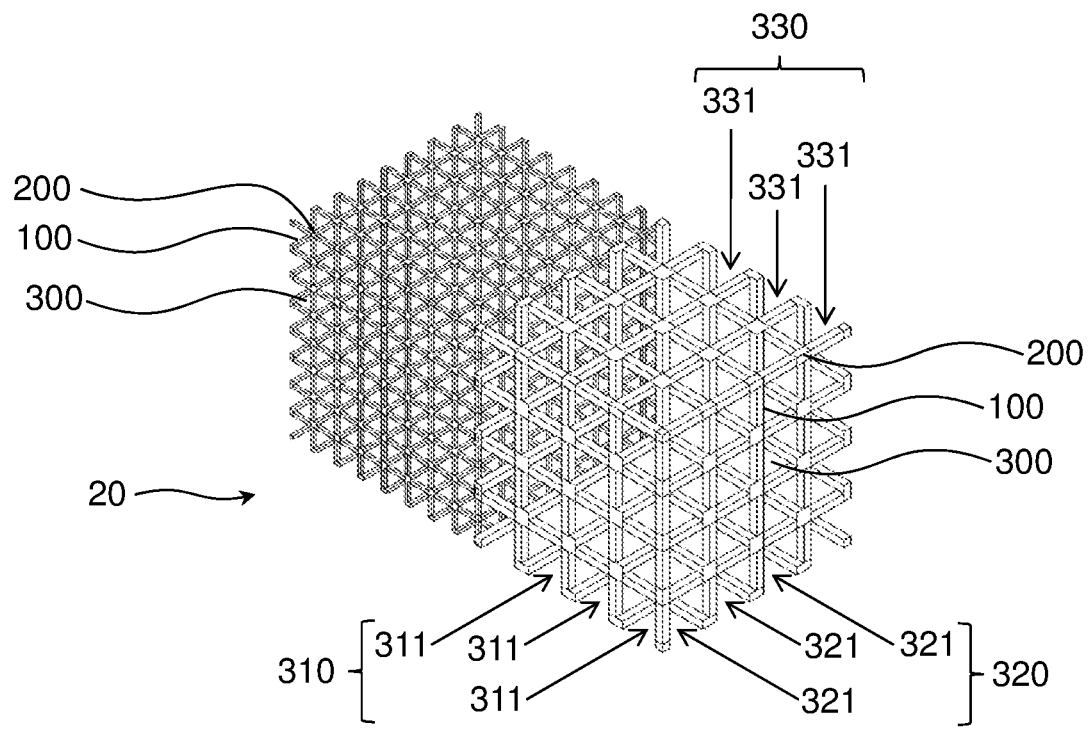
FIG. 4 shows a further porous body according to the invention.

The body 20 shown in FIG. 4 has, in its section shown to the left of the figure, a higher spatial density of node points 200 than in the section shown to the right of the figure. For better illustration, the aforementioned embodiment is discussed with reference to the section shown on the right. An array 310 of individual channels 311, the direction of which is specified by arrows, extends through the body at right angles to the face of the body facing toward it. It is of course not just the three channels identified by reference numerals but all channels that extend through the body at right angles to the face specified.

The same applies to the channels 321 of the group of channels 320 and the channels 331 of the group of channels 330, which run at right angles to one another and at right angles to the channels 311 of the first group of channels 310. The material of the body which remains between the mutually penetrating channels 311, 321, 331 forms the struts 100 and node points 200.

It is possible that the individual channels 311, 321, 331 have a polygonal or round cross section. Examples of polygonal cross sections are trigonal, tetragonal, pentagonal and hexagonal cross sections. FIG. 4 shows square cross sections of all channels 311, 321, 331. It is also possible that the individual channels 311, 321, 331 within the first 310, second 320 and third 330 group of channels each have the same cross section. This is shown in FIG. 4.

It is likewise possible that the cross section of the individual channels 311 of the first group of channels 310, the cross section of the individual channels 321 of the second group of channels 320 and the cross section of the individual channels 331 of the third group of channels 330 are different from one another. For example, the channels 311 may have a square cross section, the channels 321 a round cross section, and the channels 331 a hexagonal cross section. The cross section of the channels determines the shape of the struts 100, and so, in the case of different cross sections, different characteristics of the body 20 can also be achieved depending on the spatial directions.

In one variant, the spatial density of the node points 200 in a first region of the body 20 may be different from the spatial density of the node points 200 in a second region of the body 20. This is shown in schematic form in the one-piece body 20 according to FIG. 4. As already mentioned, the body 20 shown therein has a higher spatial density of node points 20 in its section shown to the left of the figure than in its section shown to the right of the figure.

Only every second node point 200 in the left-hand section forms a strut 100 to a node point 200 in the right-hand section.

Figure 5:
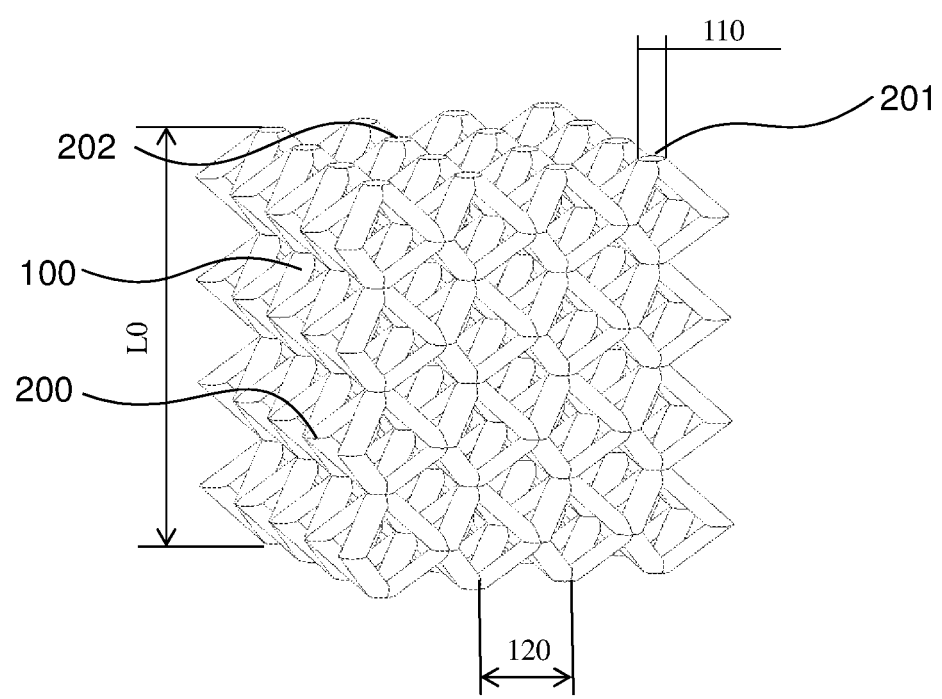
FIG. 5 a porous structure according to Example 1 and Example 2.

FIG. 5 is described in connection with the Examples as follows in the Experimental part.

EXPERIMENTAL PART

Examples

The materials and filaments according to the present invention which were used in the following experiments have been produced by extrusion of the raw materials (in form of granules, pellets, powder or cut in coarse material with a maximum diameter of 4 to 6 mm) at temperatures below 240° C. into filaments with a diameter of 1.75 mm.

The Thermoplastic Polyurethane (TPU) filaments according to the present invention with a diameter of 1.75 mm have been produced by extrusion of a TPU grade based on an aliphatic isocyanate ether/ester-hybrid type with a hardness of Shore 85 A and a TPU grade based on an aromatic isocyanate ester type with a hardness of Shore 90 A, respectively.

All filaments have been dried prior to use for 24 h at 30° C. in a vacuum drying cabinet.

Two porous bodies according to the invention were manufactured using an additive manufacturing process and their compression hardness was measured.

Example 1

A porous body was manufactured using the additive manufacturing process of fused deposition modelling (FDM). The build material was a thermoplastic polyurethane (TPU) filament, made by extrusion of pellets of a TPU grade based on an aromatic isocyanate ester type with a hardness of Shore 90 A into a round filament with 1.75 mm diameter. This filament was fed into a DD3 extruder mounted on a PRUSA I3 printer. The nozzle temperature of the DD3 extruder was set to 235° C. and the print speed to 25 mm/s.

The porous body was printed layer-by-layer using the TPU filament according to a section of the scaffold structure as shown in FIG. 5 as a cube with an edge length L of 30 mm, a bar width 110 of 2.5 mm and a distance 120 between nodes 200 of the body-centered lattice of 4.5 mm. The section of the scaffold structure was chosen in a manner that all bars end at the faces of the cube in truncated nodes 202 and at the edges of the cube in truncated nodes 201.

The compression hardness of the as manufactured porous body was measured on the basis of DIN EN ISO 3386-1: 2010-09 using an Instron 5566 machine from INSTRON GmbH, Germany. The measurement was performed at room temperature (23° C.) and a traverse speed of 100 mm/min. The porous body was consecutively compressed 3 times by 40% (corresponding to a residual height L0 of 60%=1.8 cm compared to height L of 3 cm of the uncompressed cube) and relaxed immediately using the same traverse speed. Afterwards, the porous structure was compressed for a fourth time by 40% and the used force for this compression is recorded. The value is given in TABLE 1.

Example 2

A porous body as of Example 1 was manufactured, however, using a filament made out of a TPU grade based on an aliphatic isocyanate ether/ester-hybrid type with a hardness of Shore 85 A. The printer settings are equal to the ones given in Example 1 and the compression hardness measurement was performed as described in Example 1.

TABLE 1

Table 1: compression strength investigation based on DIN EN ISO 3386-1: 2010-09

| Material | TPU grade of Ex. 1, Shore A 90 | TPU grade of Ex. 2, Shore A 85 |
|---|---|---|
| width [mm] | 29.8 | 28.7 |
| length [mm] | 28.3 | 28.2 |
| height [mm] | 28.3 | 29.1 |
| area [mm$^2$] | 800.9 | 820.6 |
| volume [mm$^3$] | 23866.5 | 23551.8 |
| weight [g] | 4.1550 | 3.7200 |
| density [g/cm$^3$] | 0.1741 | 0.1579 |
| force for 40% compression [N] | 25.3 | 18.9 |
| modulus [N/mm$^2$] or Mpa | 0.0316 | 0.0230 |
| modulus [kPa] | 31.6 | 23.0 |

It can be clearly observed, that suitable combinations of 3D printed inventive geometry design and materials with a material hardness (Shore A) <98 according to the invention in combination with the inventive void density and distribution yield excellent mechanical results and perfectly target a 40% compression, DIN EN ISO 3386-1:2010-09.

Various aspects of the subject matter described herein are set out in the following numbered clauses:

1. Porous body (10, 20) comprising a three-dimensional network of node points (200) joined to one another by struts (100), and a void volume (300) present between the struts (100),
characterized in that
   the struts (100) have an average length of ≥200 μm to ≤50 mm,
   the struts (100) have an average thickness of ≥100 μm to ≤5 mm, and in that
   the body has a compression hardness (40% compression, DIN EN ISO 3386-1: 2010-09) in at least one spatial direction of ≥10 to ≤100 kPa.
2. Porous body (10, 20) according to clause 1, wherein the body has a compression set after 40% compression (DIN ISO 815-1) of ≤5%.
3. Porous body (10, 20) according to one of clauses 1 and 2, wherein the body has a tan δ value (20° C., DMA, DIN EN ISO 6721) in at least one spatial direction of ≥0.1 to ≤1.5 and/or the body has a maximum tan δ value (DMA, DIN EN ISO 6721) in at least one spatial direction at ≥−10° C. to ≤40° C.
4. Porous body (10, 20) according to any one of clauses 1 to 3, wherein the compression hardness (40% compression, DIN EN ISO 3386-1:2010-09) of the body in a selected spatial direction differs by ≥10% from the compression hardness (40% compression, DIN EN ISO 3386-1:2010-09) of the body in a spatial direction at right angles to the spatial direction selected,
and/or
the tan δ value (20° C., DMA, DIN EN ISO 6721) of the body in a selected spatial direction differs by ≥10% from the tan δ value (20° C., DMA, DIN EN ISO 6721) of the body in a spatial direction at right angles to the spatial direction selected.
5. Porous body (10, 20) according to any one of clauses 1 to 3, wherein the compression hardness (40% compression, DIN EN ISO 3386-1:2010-09) of the body in a selected spatial direction differs by ≤10% from the compression hardness (40% compression, DIN EN ISO 3386-1:2010-09) of the body in other spatial directions and/or the tan δ value (20° C., DMA, DIN EN ISO 6721) of the body in a selected spatial direction differs by ≤10% from the tan δ value (20° C., DMA, DIN EN ISO 6721) of the body in other spatial directions.

6. Porous body (10, 20) according to any one of clauses 1 to 5, wherein the body is at least partly formed from a material having one or more of the following properties:
- a tan δ value (20° C., DMA, DIN EN ISO 6721) of ≥0.1 to ≤1.5
- a maximum tan δ value (DMA, DIN EN ISO 6721) at ≥−10° C. to ≤40° C.
- a modulus of elasticity (DIN EN ISO 604:2003-12) of ≥1 MPa to ≤800 MPa
- a Shore hardness (DIN ISO 7619-1:2012-02) of ≥40 A to ≤70 D
- a melting point (DIN EN ISO 11357-3:2013-04) of ≤220° C.
- a glass transition temperature $T_g$ (DMA, DIN EN ISO 6721) of ≤40° C.

7. Porous body (10, 20) according to any one of clauses 1 to 6, wherein the void volume (300) makes up ≥50% to ≤99% of the volume of the body (10, 20).

8. Porous body (10, 20) according to any one of clauses 1 to 7, wherein the node points (200) are distributed in a periodically repeating manner in at least part of the volume of the body (10, 20).

9. Porous body (10, 20) according to any one of clauses 1 to 8, wherein the void volume (300) is formed in the form of mutually penetrating first (310), second (320) and third (330) groups of channels, wherein a multitude of individual channels (311, 321, 331) within each respective group of channels run parallel to one another and the first group of channels (310), the second group of channels (320) and the third group of channels (330) extend in different spatial directions.

10. Porous body (10, 20) according to any one of clauses 1 to 9, wherein the average minimum angle between adjacent struts (100) is ≥30° to ≤140°.

11. Porous body (20) according to any one of clauses 1 to 10, wherein the spatial density of the node points (200) in a first region of the body (10, 20) is different from the spatial density of the node points (200) in a second region of the body (10, 20).

12. Porous body (10, 20) according to any one of clauses 1 to 11, wherein the material of the body (10, 20) in a first region of the body (10, 20) is different from the material in a second region of the body (10, 20).

13. Method of producing a porous body (10, 20) according to any one of clauses 1 to 12, characterized in that the body (10, 20) is produced in an additive manufacturing method.

14. Apparatus for supporting and/or bearing a person, comprising a porous body (10, 20) according to any one of clauses 1 to 11.

15. Apparatus according to clause 14, further comprising a ventilator for passing air through at least a portion of the porous body (10, 20).

What is claimed is:
1. A porous body comprising a three-dimensional network of node points joined to one another by struts, and a void volume present between the struts, wherein
the struts have an average length of ≥200 μm to ≤50 mm,
the struts have an average thickness of ≥100 μm to ≤5 mm, and in that the body has a compression hardness (40% compression, DIN EN ISO 3386-1: 2010-09) in at least one spatial direction of ≥10 to ≤100 kPa wherein the spatial density of the node points in a first region of the body is different from the spatial density of the node points in a second region of the body, wherein the spatial density of the node points in the first region of the body is from ≥5 node points/cm$^3$ to ≤200 node points/cm$^3$, and the spatial density of the node points in a second region of the body is, with the proviso that the spatial density of the node points is different from the density in the first region, from ≥5 node points/cm$^3$ to ≤200 node points/cm$^3$, wherein the first region of the body and the second region of the body consist of a different material, and wherein the material for each of the first and second region is selected from the group consisting of thermoplastic elastomers (TPE), thermoplastic polyurethane (TPU), polycarbonate (PC), polyamide (PA), polyethylene terephthalate (PET), polybutylene terephthalate (PBT), cycloolefinic copolyesters (COC), polyether ether ketone (PEEK), polyether amide ketone (PEAK), polyetherimide (PEI), polyimide (PI), polypropylene (PP), polyethylene (PE), acrylonitrile-butadiene-styrene (ABS), polylactate (PLA), polymethylmethacrylate (PMMA), polystyrene (PS), polyvinyl chloride (PVC), polyoxymethylene (POM), polyacrylonitrile (PAN), polyacrylate and celluloid.

2. The porous body according to claim 1, wherein the body has a compression set after 40% compression (DIN ISO 815-1) of ≤5%.

3. The porous body according to claim 1, wherein the body has a tan δ value (20° C., DMA, DIN EN ISO 6721) in at least one spatial direction of ≥0.1 to ≤1.5 and/or the body has a maximum tan δ value (DMA, DIN EN ISO 6721) in at least one spatial direction at ≥−10° C. to ≤40° C.

4. The porous body according to claim 1, wherein the compression hardness (40% compression, DIN EN ISO 3386-1:2010-09) of the body in a selected spatial direction differs by ≥10% from the compression hardness (40% compression, DIN EN ISO 3386-1:2010-09) of the body in a spatial direction at right angles to the spatial direction selected,
and/or
the tan δ value (20° C., DMA, DIN EN ISO 6721) of the body in a selected spatial direction differs by ≥10% from the tan δ value (20° C., DMA, DIN EN ISO 6721) of the body in a spatial direction at right angles to the spatial direction selected.

5. The porous body according to claim 1, wherein the compression hardness (40% compression, DIN EN ISO 3386-1:2010-09) of the body in a selected spatial direction differs by <10% from the compression hardness (40% compression, DIN EN ISO 3386-1:2010-09) of the body in other spatial directions and/or the tan δ value (20° C., DMA, DIN EN ISO 6721) of the body in a selected spatial direction differs by <10% from the tan δ value (20° C., DMA, DIN EN ISO 6721) of the body in other spatial directions.

6. The porous body according to claim 1, wherein the body is at least partly formed from a material having one or more of the following properties:
- a tan δ value (20° C., DMA, DIN EN ISO 6721) of ≥0.1 to ≤1.5
- a maximum tan δ value (DMA, DIN EN ISO 6721) at ≥−10° C. to ≤40° C.
- a modulus of elasticity (DIN EN ISO 604:2003-12) of ≥1 MPa to ≤800 MPa a Shore hardness (DIN ISO 7619-1:2012-02) of ≥40 A to ≤70 D
a melting point (DIN EN ISO 11357-3:2013-04) of ≤220° C.
a glass transition temperature $T_g$ (DMA, DIN EN ISO 6721) of ≤40° C.

7. The porous body according to claim 1, wherein the void volume makes up ≥50% to ≤99% of the volume of the body.

8. The porous body according to claim 1, wherein the node points are distributed in a periodically repeating manner in at least part of the volume of the body.

9. The porous body according to claim 1, wherein the void volume is formed in the form of mutually penetrating first, second and third groups of channels, wherein a multitude of individual channels within each respective group of channels run parallel to one another and the first group of channels, the second group of channels and the third group of channels extend in different spatial directions.

10. The porous body according to claim 1, wherein the average minimum angle between adjacent struts is ≥30° to ≤140°.

11. The porous body according to claim 1, wherein the body is produced in an additive manufacturing method.

12. An apparatus for supporting and/or bearing a person, comprising a porous body comprising a three-dimensional network of node points joined to one another by struts, and a void volume present between the struts, wherein the struts have an average length of ≥200 μm to ≤50 mm, wherein the struts have an average thickness of ≥100 μm to ≤5 mm, and wherein the body has a compression hardness (40% compression, DIN EN ISO 3386-1: 2010-09) in at least one spatial direction of ≥10 to ≤100 kPa; and a ventilator for passing air through at least a portion of the porous body, wherein the spatial density of the node points in a first region of the body is different from the spatial density of the node points in a second region of the body, wherein the spatial density of the node points in the first region of the body is from ≥5 node points/cm³ to ≤200 node points/cm³, and the spatial density of the node points in the second region of the body is with the proviso that the spatial density of the node points is different from the density in the first region, from ≥5 node points/cm³ to ≤200 node points/cm³, wherein the first region of the body and the second region of the body consist of a different material, and wherein the material for each of the first and the second region is selected from the group consisting of thermoplastic elastomers (TPE), thermoplastic polyurethane (TPU), polycarbonate (PC), polyamide (PA), polyethylene terephthalate (PET), polybutylene terephthalate (PBT), cycloolefinic copolyesters (COC), polyether ether ketone (PEEK), polyether amide ketone (PEAK), polyetherimide (PEI, polyamide (PI), polyproylene (PP), polyethylene (PE), acrylonitrile-butadiene-styrene (ABS), polylactate (PLA), polymethylmethacrylate (PMMA), polystyrene (PS), polyvinyl chloride (PVC), polyoxymethylene (POM), polyacrylonitrile (PAN), polyacrylate and celluloid.

13. The apparatus according to claim 12, wherein the porous body has a compression set after 40% compression (DIN ISO 815-1) of ≤5%.

14. The apparatus according to claim 12, wherein the porous body has a tan δ value (20° C., DMA, DIN EN ISO 6721) in at least one spatial direction of ≥0.1 to ≤1.5 and/or the body has a maximum tan δ value (DMA, DIN EN ISO 6721) in at least one spatial direction at ≥−10° C. to ≤40° C.

15. The apparatus according to claim 12, wherein the compression hardness (40% compression, DIN EN ISO 3386-1:2010-09) of the body in a selected spatial direction differs by ≥10% from the compression hardness (40% compression, DIN EN ISO 3386-1:2010-09) of the body in a spatial direction at right angles to the spatial direction selected, and/or the tan δ value (20° C., DMA, DIN EN ISO 6721) of the body in a selected spatial direction differs by ≥10% from the tan δ value (20° C., DMA, DIN EN ISO 6721) of the body in a spatial direction at right angles to the spatial direction selected.

16. The apparatus according to claim 12, wherein the compression hardness (40% compression, DIN EN ISO 3386-1:2010-09) of the body in a selected spatial direction differs by <10% from the compression hardness (40% compression, DIN EN ISO 3386-1:2010-09) of the body in other spatial directions and/or the tan δ value (20° C., DMA, DIN EN ISO 6721) of the body in a selected spatial direction differs by <10% from the tan δ value (20° C., DMA, DIN EN ISO 6721) of the body in other spatial directions.

17. The apparatus according to claim 12, wherein the body is at least partly formed from a material having one or more of the following properties:
a tan δ value (20° C., DMA, DIN EN ISO 6721) of ≥0.1 to ≤1.5
a maximum tan δ value (DMA, DIN EN ISO 6721) at ≥−10° C. to ≤40° C.
a modulus of elasticity (DIN EN ISO 604:2003-12) of ≥1 MPa to ≤800 MPa
a melting point (DIN EN ISO 11357-3:2013-04) of ≤220° C.
a glass transition temperature $T_g$ (DMA, DIN EN ISO 6721) of ≤40° C.

18. The apparatus according to claim 12, wherein the void volume comprises ≥50% to ≤99% of the volume of the body.

19. The apparatus according to claim 12, wherein the node points are distributed in a periodically repeating manner in at least part of the volume of the body.

20. The apparatus according to claim 12, wherein the void volume is formed in the form of mutually penetrating first, second and third groups of channels, wherein a multitude of individual channels within each respective group of channels are arranged parallel to one another and the first group of channels, the second group of channels and the third group of channels extend in different spatial directions.

21. The apparatus according to claim 12, wherein the average minimum angle between adjacent struts is ≥30° to ≤140°.

22. The apparatus according to claim 12, wherein the porous body is produced in an additive manufacturing method.

23. The apparatus according to claim 12, wherein the spatial density of the node points in the first region of the body is ≥39 node points/cm³ to ≤41 node points/cm³ and the spatial density of the node points in the second region of the body is ≥19 node points/cm³ to ≤21 node points/cm³.

24. The apparatus according to claim 12, wherein the node points are arranged in accordance with a Bravais lattice selected from the group consisting of simple cubic, body-centred cubic, face-centred cubic, simple tetragonal, body-centred tetragonal, simple orthorhombic, base-centred orthorhombic, body-centred orthorhombic, face-centred orthorhombic, simple hexagonal, rhombohedral, simple monoclinic, base-centred monoclinic and triclinic.

25. An apparatus for supporting and/or bearing a person, comprising a porous body comprising a three-dimensional network of node points joined to one another by struts, and a void volume present between the struts, wherein the struts have an average length of ≥200 μm to ≤50 mm, wherein the struts have an average thickness of ≥100 μm to ≤5 mm, and wherein the body has a compression hardness (40% compression, DIN EN ISO 3386-1: 2010-09) in at least one spatial direction of ≥10 to ≤100 kPa; and a ventilator for passing air through at least a portion of the porous body, wherein the porous body has a compression set after 40% compression (DIN ISO 815-1) of ≤5%, and wherein the porous body has a tan δ value (20° C., DMA, DIN EN ISO 6721) in at least one spatial direction of ≥0.1 to ≤1.5 and/or the body has a maximum tan δ value (DMA, DIN EN ISO 6721) in at least one spatial direction at ≥−10° C. to ≤40° C. wherein the spatial density of the node points in a first region of the body is different from the spatial density of the node points in a second region of the body, wherein the spatial density of the node points in the first region of the body is from ≥5 node points/cm$^3$ to ≤200 node points/cm$^3$, and the spatial density of the node points in a second region of the body is, with the proviso that the spatial density of the node points is different from the density in the first region, from ≥5 node points/cm$^3$ to ≤200 node points/cm$^3$, wherein the first region of the body and the second region of the body consist of a different material, and wherein the material for each of the first and second region is selected from the group consisting of thermoplastic elastomers (TPE), thermoplastic polyurethane (TPU), polycarbonate (PC), polyamide (PA), polyethylene terephthalate (PET), polybutylene terephthalate (PBT), cycloolefinic copolyesters (COC), polyether ether ketone (PEEK), polyether amide ketone (PEAK), polyetherimide (PEI), polyimide (PI), polypropylene (PP), polyethylene (PE), acrylonitrile-butadiene-styrene (ABS), polylactate (PLA), polymethylmethacrylate (PMMA), polystyrene (PS), polyvinyl chloride (PVC), polyoxymethylene (POM), polyacrylonitrile (PAN), polyacrylate and celluloid.

\* \* \* \* \*